US009007238B2

(12) United States Patent
Whiton et al.

(10) Patent No.: US 9,007,238 B2
(45) Date of Patent: Apr. 14, 2015

(54) METHODS AND DEVICES FOR PROVIDING ROUTE INFORMATION

(75) Inventors: Joshua Whiton, Raleigh, NC (US); Justin Harris, Ann Arbor, MI (US); Jesse Lovelace, Austin, TX (US)

(73) Assignee: TransLoc Inc., Durham, NC (US)

( * ) Notice: Subject to any disclaimer, the term of this patent is extended or adjusted under 35 U.S.C. 154(b) by 917 days.

(21) Appl. No.: 13/076,076

(22) Filed: Mar. 30, 2011

(65) Prior Publication Data

US 2011/0175756 A1    Jul. 21, 2011

Related U.S. Application Data

(63) Continuation-in-part of application No. 11/348,985, filed on Feb. 7, 2006, now Pat. No. 7,920,967.

(60) Provisional application No. 60/715,077, filed on Sep. 8, 2005.

(51) Int. Cl.
*G08G 1/123* (2006.01)
*G01C 21/36* (2006.01)
*G08G 1/13* (2006.01)

(52) U.S. Cl.
CPC ............. *G01C 21/3626* (2013.01); *G08G 1/13* (2013.01)

(58) Field of Classification Search
CPC ................................ B60K 37/02; G01C 21/26
USPC ............... 340/438, 995.19; 701/22, 117, 440, 701/457, 532
See application file for complete search history.

(56) References Cited

PUBLICATIONS

Michael Caloagno, NYC Subway Map, Jul. 22, 2001 Edition.*

* cited by examiner

*Primary Examiner* — Redhwan k Mawari
*Assistant Examiner* — Rodney P King
(74) *Attorney, Agent, or Firm* — Coats & Bennett, P.L.L.C.

(57) ABSTRACT

Route information for at least a first route and a second route is displayed using display indicators assigned to each route. The routes may be decomposed into discrete segments, some of which may be shared among the routes. Upon determining which segments are shared by routes, the shared segments may be displayed using an interleaved pattern of the display indicators associated with the routes. The interleaved pattern may comprise an alternating pattern of the display indicators associated with the routes. Shared segments may also be displayed in a cycling pattern that includes the respective display indicators of the shared routes. Non-shared segments may be displayed with the respective display indicators for the routes that use that segment. The width of the patterns along the shared segments may be substantially the same as the width of the non-shared segments. In one embodiment, the routes may be fixed. Targets associated with each route may be displayed on the routes.

13 Claims, 12 Drawing Sheets

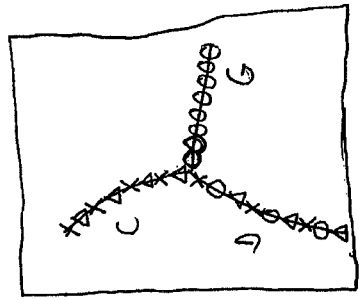
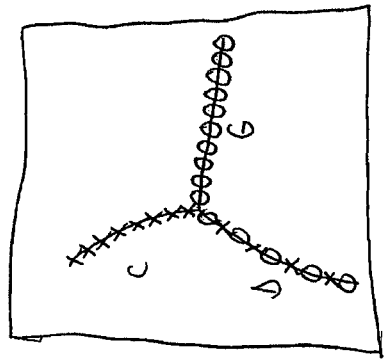
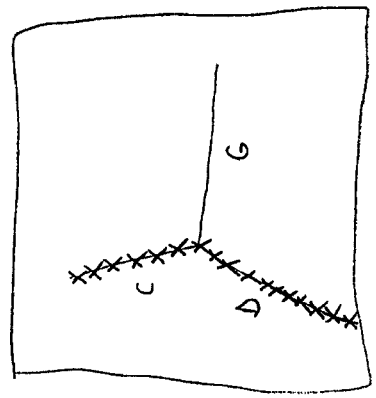
FIG. 4

METHODS AND DEVICES FOR PROVIDING ROUTE INFORMATION

CROSS REFERENCES TO RELATED APPLICATIONS

The present application is a continuation-in-part of application Ser. No. 11/348,985, filed Feb. 7, 2006, now U.S. Pat. No. 7,920,967, which claims priority to U.S. provisional application Ser. No. 60/715,077, filed Sep. 8, 2005, each of which is hereby incorporated by reference in its entirety.

BACKGROUND

Transit visualization systems ("TVS") provide updated graphical information relating to the positions of a vehicle or other targets (e.g., luggage or parcels) along a route. This type of information may be used by transit operators, shipping companies, government entities, and universities to track the progress and location of a target. In one example, the target is a mass transit vehicle. Therefore, the location and expected arrival time of a shuttle at a predetermined stop along a route can be seen on a TVS display. Some systems display a map that includes routes for the target and a graphical representation of the target position along the route. Given that the TVS display provides updated target positions, various advantages may be provided by a TVS, including reduced wait times for passengers, improved safety, and improved customer satisfaction.

The success of a TVS may depend upon several factors that include displaying true real time tracking information and displaying this information in an uncluttered, easily recognizable manner. In order to appeal to a broad customer base, a TVS display may provide route and position information for many targets. Several disadvantages arise as the amount of information that is displayed increases. First, a TVS display map may become cluttered with information that is not relevant to each user. Second, the amount of information that must be transmitted to successfully display all target route and position information increases. The ability of a TVS to display real time target information for tracked targets is subject to bandwidth limitations. Therefore, transmitting and displaying all target information on a TVS display may not be an optimal solution.

SUMMARY

Embodiments disclosed herein are directed to the optimization of information that is transmitted and displayed in a TVS. Route information for a plurality of routes may be displayed using display indicators assigned to each route. The routes may be decomposed into discrete segments, some of which are shared among the routes. Upon determining which segments are shared by routes, the shared segments may be displayed using an interleaved pattern of the display indicators associated with the routes. The patterns may be created based upon a visibility state for routes that share the segment. Thus, in one embodiment, the interleaved pattern is created using display indicators for visible routes. The interleaved pattern may comprise an alternating pattern of the display indicators associated with the routes. The shared segments may also include a cycling pattern of the respective display indicators. Non-shared segments may be displayed with the respective display indicators for the routes that use that segment. The width of the interleaved and cycling patterns may be substantially the same as the width of the non-shared segments. In one embodiment, the routes may be fixed. Targets associated with each route may be displayed on the routes.

One aspect is directed to a method of displaying on an electronic display a graphical depiction of route information determined by an electronic route processor. The method includes accessing a computer memory and obtaining data defining a first route and a second route; assigning a first display indicator to the first route; assigning a second display indicator to the second route; processing the first and second routes in the electronic route processor and determining discrete route segments that are shared by both the first and second routes; and displaying on the electronic display as the graphical depiction of the route information a repeating pattern of the first and second route indicators along the shared route segments with the repeating pattern including one or more of the first route indicators followed by one or more of the second route indicators.

Another aspect is directed to a method of displaying on an electronic display a graphical depiction of route information determined by an electronic route processor. The method includes accessing a computer memory and obtaining data defining a first route and a second route; assigning a first display indicator to the first route; assigning a second display indicator to the second route; processing the first and second routes in the electronic route processor and determining discrete route segments that are shared by both the first and second routes; and displaying on the electronic display as the graphical depiction of the route information the first display indicator along non-shared segments of the first route, the second display indicator along non-shared segments of the second route, and a timed cycling pattern of the first display indicators along the one or more shared route segments for a first time interval and the second display indicators along the one or more shared route segments for a second time interval.

Another aspect is directed to a method of displaying on an electronic display a graphical depiction of route information determined by an electronic route processor. The method includes accessing a computer memory and obtaining data defining multiple routes; assigning separate unique display indicators to each of the routes; processing the routes in the electronic route processor and determining discrete route segments that are shared by at least two of the routes; and displaying on the electronic display as the graphical depiction of the route information the respective display indicator along non-shared segments of the routes and a timed cycling pattern of the respective display indicators along the shared route segments, the timed cycling pattern including individually displaying each of the respective display indicators for a period of time.

BRIEF DESCRIPTION OF THE DRAWINGS

FIG. 4 is a series of mapped segments illustrating an interleaved pattern for shared route segments according to one embodiment;

DETAILED DESCRIPTION

Figure 1:
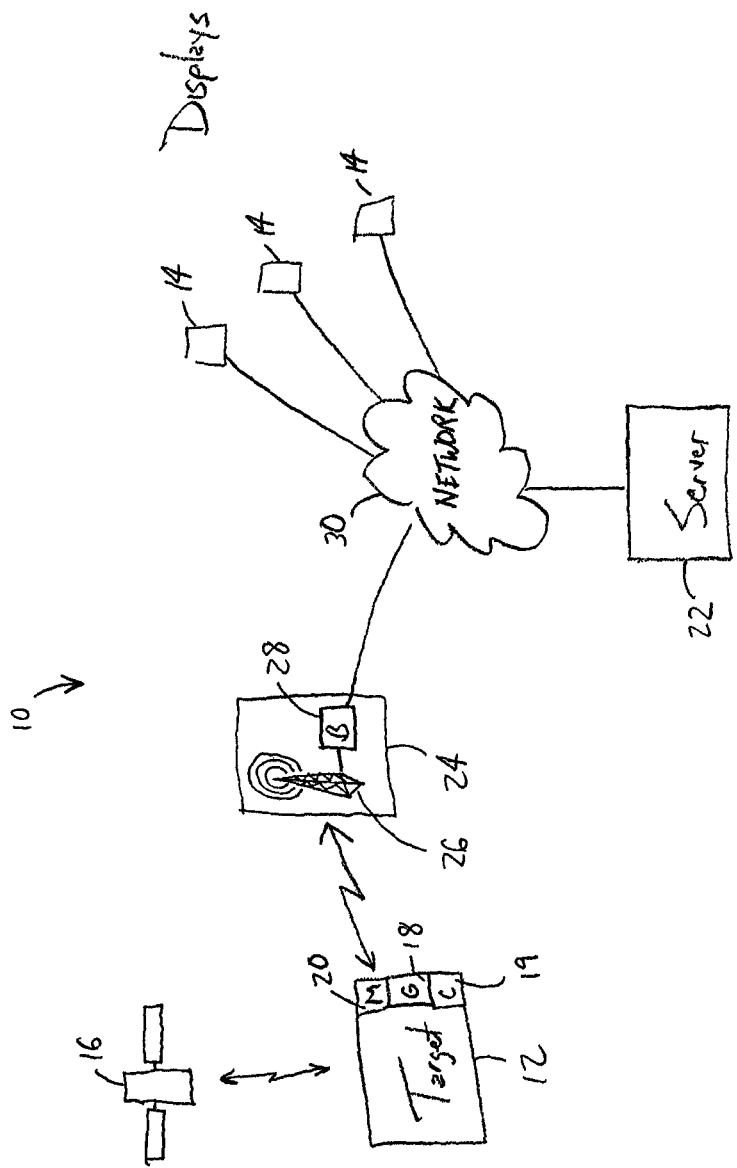
FIG. 1 is a functional block diagram of a transit visualization system according to one embodiment.

The various embodiments disclosed herein are applicable in a transit visualization system ("TVS") that provides updated graphical information relating to the positions of one or more targets along a route. A representative TVS is illustrated in FIG. 1 and is identified generally by reference number 10. Generally, one characteristic function of the TVS 10 is to provide updated graphical information related to the position of a target 12 to users on displays 14. The TVS 10 may be used to track the position of different types of targets 12. For example, the target 12 may be a package, a component on an assembly line, or a transit vehicle such as a bus, shuttle, ferry, subway, trolley, taxi, and the like.

Target 12 tracking may be provided using a number of technologies. In one embodiment, a Global Positioning System ("GPS") tracking system is used. GPS uses a network of satellites 16 to triangulate the position of a receiver and provide position coordinates. To that end, the target 12 may be provided with a GPS receiver device 18 that works in conjunction with the satellites 16 to determine a current position (often in terms of a latitude and longitude coordinate set) for the target 12. The current position of the target 12 is updated within the GPS receiver device 18 through communications with the satellites 16.

Other means of determining the position of the target 12 may be used. For instance, assisted GPS (A-GPS) and Television assisted GPS (TV-GPS) offer possible alternative technologies that may be used to track the target 12. A-GPS describes a system where outside sources, such as an assistance server (Mobile Location Server) coupled to a network, help a GPS receiver 18 execute range measurements and determine the target 12 position. TV-GPS is a system that combines television signals with GPS technology for tracking targets 12 in places where GPS alone is inadequate, such as between high-rise buildings of urban centers or inside buildings and garages. Other technologies that do not rely on satellite 16 technology may also be used. For instance, accelerometers may be used to calculate distances traveled based upon time and acceleration values. Another similar technique uses dead reckoning as a process of estimating a global position of the target 12 by advancing a known position using course, speed, time and distance traveled. In one embodiment, the tracking in instantaneous and continually updated.

In an alternative embodiment, the target 12 may be equipped with a tracking device that permits location tracking using a more passive approach. For instance, the target 12 may comprise a node, button, or tag, such as an RFID tags that may be tracked by a geographic information system.

Regardless of the method used to determine a current position, data representative of the position of the target 12 can be transmitted to a tracking server 22. In one embodiment, the target 12 is provided with a mobile communications device 20 that permits data transmission to and from a communications station 24. In one embodiment, the mobile communications device 20 is able to send transmissions but not receive transmissions. The communications station 24 may comprise a transceiver (e.g., tower) 26 and a base station 28. The base station 28 comprises the necessary hardware/software to convert the received wireless data (which may be cellular, circuit switched, or packet switched data) to a suitable data protocol for transmission over a network 30 such as the Internet.

The position data is received by a tracking server 22. The tracking server 22 processes the received position data for one or more targets 12 and presents the position data that is accessible by remote client displays 14. In one embodiment, the position data is provided in the form of a web page that is accessible by clients associated with each display 14. The displays 14 may be embodied in a variety of device types. For instance, the display 14 may be a computer monitor for desktop, laptop, and handheld computer devices. The display 14 may be a dedicated monitor provided in the form of a kiosk that continually shows the updated target 12 position data. Alternatively, the display 14 may be an LCD display on a wireless communications handset such as a PDA, Blackberry, cellular telephone, pager, or the like.

Figure 2:
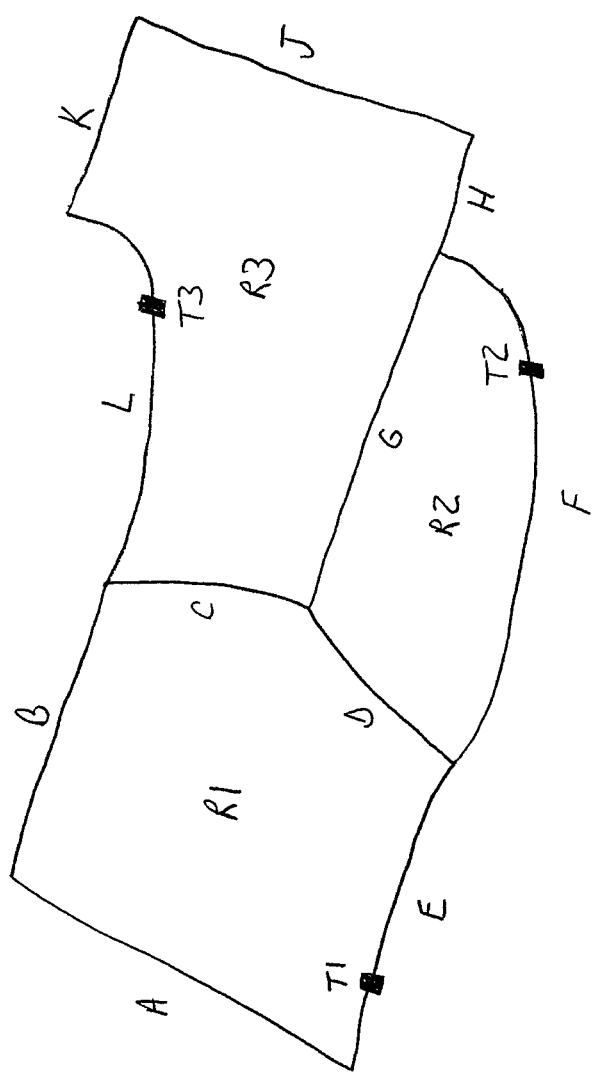
FIG. 2 is an exemplary transit map illustrating routes, segments, and targets according to one embodiment.

For these different display 14 types, the target 12 position data may be presented in the form of a map. FIG. 2 shows an exemplary map that may be presented on the displays 14. In this example, the map includes three different routes identified as R1, R2, and R3. Further, three separate targets T1, T2, T3 are shown at various locations along these routes R1, R2, R3. In addition, each route R1, R2, R3 is divided into segments. For example, route R1 is divided into the segments A, B, C, D, and E. The segments are used by the tracking server 22 to render the maps and track the position of the targets T1, T2, T3 in a manner that is described in greater detail below. The segment labels (e.g., A, B, C, etc.) may not be important to the end users and may or may not be shown on the display 14. However, the segment labels are illustrated in FIG. 2 to demonstrate the route generation and rendering processes described herein.

Figure 3:
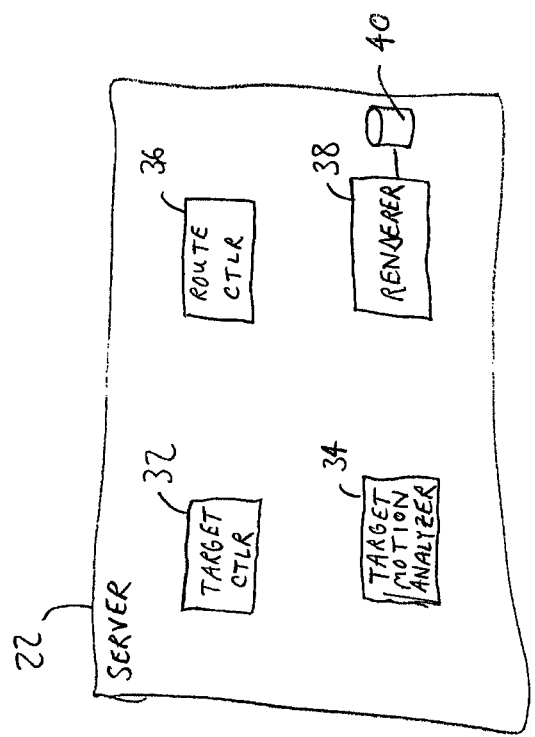
FIG. 3 is a functional block diagram of an exemplary tracking server to track and render target information according to one embodiment.

FIG. 3 illustrates a functional block diagram illustrating various aspects of the tracking server 22 that generates the position map shown in FIG. 2. Generally, the tracking server 22 performs at least four broad functions. These include a target controller 32, a target motion analyzer 34, a route controller 36, and a renderer 38. The target controller 32 is responsible for receiving and tracking position data for multiple targets 12. Thus, the target controller 32 receives data that is transmitted by the mobile communications device 20 associated with each target 12. The content and frequency of the data transmissions between the mobile communications device 20 and the target controller 32 are optimized to minimize bandwidth and improve the rate at which the position of the target 12 is updated.

In one embodiment, the frequency of transmission from the mobile communications device 20 and the target controller 32 is based upon the distance moved by the target 12. For instance, if the target 12 does not move, the mobile communications device 20 does not transmit any position data. Similarly, the frequency of transmission from the mobile communications device 20 and the target controller 32 may be based upon the speed of target 12. That is, at slower speeds, the position data is transmitted less frequently since the position of the target 12 changes relatively little. Conversely, at higher target 12 speeds, the position of the target 12 changes at a greater rate. Therefore, the position data is transmitted more frequently at greater target 12 speeds.

The content of data transmissions between the mobile communications device 20 and the target controller 32 may also be optimized to improve data throughput. For instance, various lossless compression algorithms, including run length encoding, entropy encoding, and linear predictive encoding may be used to reduce the time that is required to update the position of the target 12. Lossy compression algorithms may also be implemented depending upon the relative resolution of the position data and the amount of lost data. In addition, the position data may be minimized by transmitting only position differences.

As an example, if the latitude and longitude readings for a target 12 in a first position are (35.77247,−78.69340), each of these coordinate values may require at least a 26-bit digital representation to identify the current position of the target 12. Now, assuming the target 12 moves to a second position identified by the coordinates (35.77454,−78.68903), the same amount of data (i.e., about 26 bits per coordinate) might need to be transmitted to identify the updated position of the target 12. However, the amount of data that is transmitted by the mobile communications device 20 may be reduced if the difference between these coordinate positions (i.e., −0.00207, −0.00437) is transmitted instead of the actual position. In one embodiment, only the significant numbers in this difference data are transmitted. For instance, in the present example, only the numbers 207 and 437 (or a digital representation thereof) are transmitted. Thus, the amount of data that is transmitted may be reduced to about 8 or 10 bits per coordinate. In an alternative embodiment, a fixed number of least significant bits representative of the difference data is transmitted. The actual position of the target 12 may be recreated by the target controller 32 using the position difference data and the last known coordinate position.

To the extent any compression processing is performed on the data prior to transmission by the mobile communications device 20, the target 12 may be configured with a mobile computer 19. That is, data compression and position difference calculations may be performed by the mobile computer 19 before the compressed data is transmitted by the mobile communications device 20. The compressed data may be decoded upon receipt by the target controller 32.

Referring to FIG. 3, the tracking server 22 may also be configured with a target motion analyzer 34 that analyzes position information for one or more targets 12 that is received and/or decoded by the target controller 32. The target motion analyzer 34 considers prior target positions, current target positions, and expected target positions (based at least partly upon a predetermined route) to smooth and correct a graphical position for the one or more targets 12. For example, the target motion analyzer 34 performs velocity and acceleration calculations to confirm that a target 12 remains on a predetermined route. In one embodiment, the target motion analyzer 34 may snap a target position onto a predetermined route if the received target position varies from an expected position by a value that falls within a predetermined range. By snapping the target to the predetermined route, small position errors such as communications errors or data compression errors can be filtered, thus providing smooth target 12 motion at the displays 14. In one embodiment, the target motion analyzer 34 may recognize that a target position has deviated from a predetermined route if the received target position varies from an expected position by a value that exceeds a predetermined range. In this case, the target motion analyzer 34 may not snap the target position back to the predetermined route.

The exemplary tracking server 22 shown in FIG. 3 also includes a route controller 36 that determines one or more predetermined routes along which a target 12 may travel. The route controller 36 may also determine whether a given route should be enabled or disabled. In one embodiment, the status of a route may be determined at the terminal 14 by a customer. In this manner, the customer may choose to display those routes that are relevant to that user or that location. In one embodiment, the route controller 36 may disable a route if the signal quality for communications from a mobile communications device 20 degrades. Thus, if a communications signal becomes weak, dirty, or disappears completely, the route controller 36 may disable the route corresponding to the target 12 that has the poor incoming signal.

As described above, the routes may be comprised of a collection of segments as illustrated in FIG. 2. For example, the three routes R1, R2, R3 shown in FIG. 2 are respectively comprised of the following segments:

R1: A, B, C, D, E
R2: D, F, G
R3: C, D, F, H, J, K, L

With these particular routes R1, R2, R3, certain segments are shared. For instance, segment D is common to all three routes R1, R2, R3. That is, targets T1, T2, T3 each travel along segment D at some point in their respective routes R1, R2, R3. Note also that segment C is common to routes R1 and R3. In one embodiment, segments are identified as portions of streets and may be represented by lists of coordinate pairs. The segments may be further defined by additional criteria in the interest of rendering segments in an interleaved pattern.

For example, there may be no routes that only cover a portion of the segment. Stated another way, all routes sharing a segment share the entire segment. Further, the segments are mutually exclusive. That is, no portion of the segment overlaps another segment. Representing routes as segmented data satisfying these requirements has several benefits. On the one hand, it ensures that segments used by multiple routes are only defined once instead of for each route. Further, it also provides a simplified mechanism for identifying segments that are shared by multiple routes. Accordingly, the segments, so defined, allow an interleaved pattern representing multiple routes for a given segment to be determined.

Examples of route interleaving over a shared segment are illustrated in FIG. 4, where three instances of the segments C, D, and G (from FIG. 2) are shown. In the map regions illustrated in FIG. 4, the routes are identified by display indicators. In this embodiment, the display indicators are shapes XX, OO, and ΔΔ. This type of route identification may be advantageous for monochrome displays. The same effect may be achieved through the use of color display indicators, particular where full color displays 14 are available. In other applications, such as for handicap-accessible applications or colorblind-accessible applications, other techniques for identifying routes may be used. For instance, routes may be associated with different fill or hatch patterns. In either case, the route interleaving generates a segment having route identifying symbols arranged along the segment in an alternating fashion. Alternatively, a list of route names or numbers may be rendered next to a segment to identify the routes that are using that segment. For each of these solutions, the highlighted segment may be rendered with a consistent thickness as opposed to multiple, parallel pathways. In one embodiment, the interleaved segments are comprised of side by side display indicators.

In the first map shown on the left side of FIG. 4, the first route R1 is enabled while the other two routes R2, R3 are disabled. Consequently, markers XX representing the first route are shown in segments C, D. In the second map shown at the center of FIG. 4, the first two routes R1, R2 are enabled, but the third route R3 remains disabled. Consequently, the markers XX and OO corresponding to routes R1 and R2 are shown. As suggested above, segment D is shared between routes R1 and R2. Therefore, the markers XX and OO are interleaved over the length of segment D. By comparison, only markers XX appear over segment C and markers OO appear over segment G.

In the third map shown on the right side of FIG. 4, all three routes R1, R2, R3 are enabled. Consequently, all markers XX, OO, and ΔΔ corresponding to routes R1, R2, R3 are shown. Notably, segment G is not shared. Thus, only the markers OO corresponding to route R2 are shown over this segment G. By comparison, segment C is shared between routes R1 and R3. Therefore, markers XX and ΔΔ are interleaved over the length of segment C. Also, segment D is shared between all three routes R1, R2, R3. Therefore, markers XX, OO, and ΔΔ are interleaved over the length of segment D.

The route interleaving may be performed by a renderer 38 in the tracking server 22 as shown in FIG. 2. The renderer 38 may interact with the route controller 36 to determine the position and status of the various routes and route segments. The renderer 38 may also determine from the route controller 36 which routes are shared at a given segment. The renderer 38 may also interact with the target motion analyzer 34 to generate a moving icon representative of the position of a target 12 along the highlighted routes.

In at least one embodiment, the renderer 38 also has access to a map database 40 as illustrated in FIG. 3. Thus, in addition to a null space, where routes and targets are rendered in a stand-alone context, the routes may be overlaid onto a map comprising geographic and architectural information. The renderer 38 may also generate graphics representative of street names or other labels, such as shuttle stops, corresponding to predetermined locations along a route.

Figure 5:
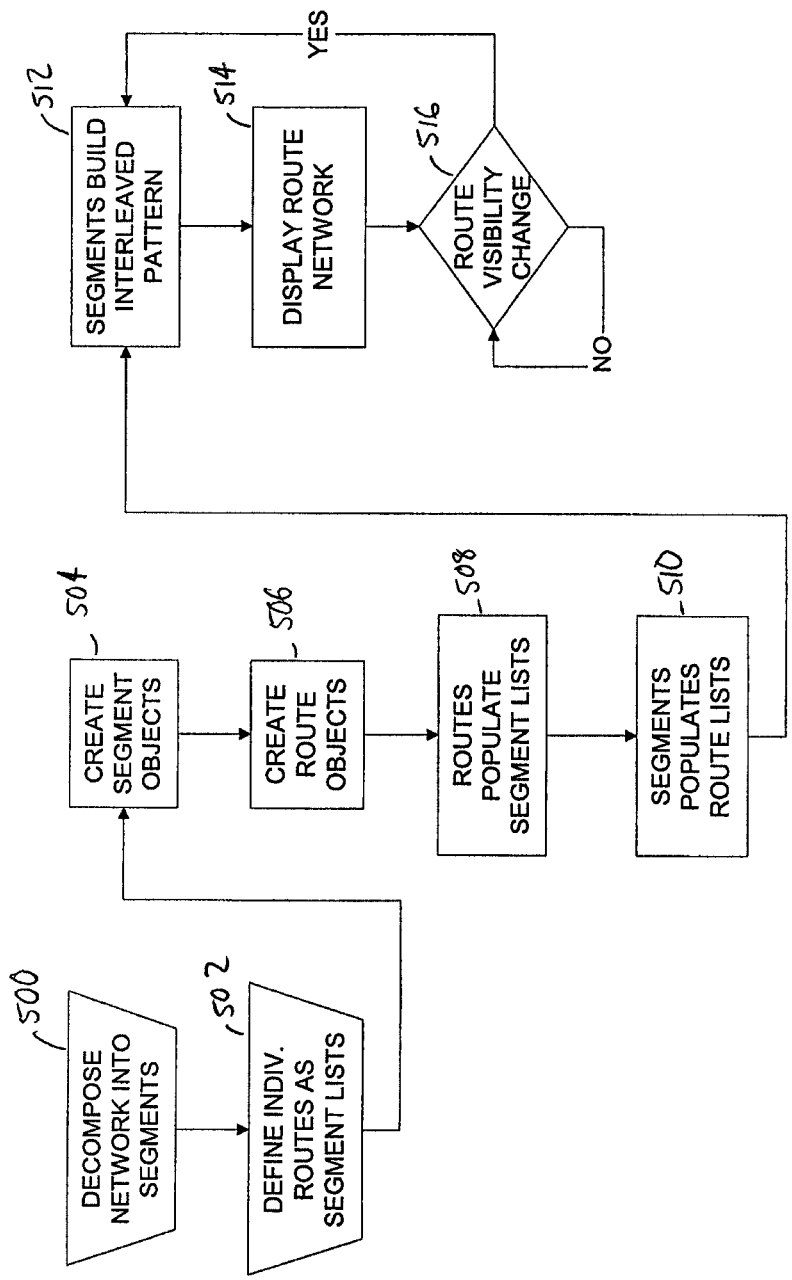
FIG. 5 is a flow diagram illustrating various software level process steps executed to render an interleaved pattern according to one embodiment.

The various routes and segments, including interleaved segments, may be created as software objects at either the level of the tracking server 22 or the display 14. The overall process is depicted in the flow diagram illustrated in FIG. 5. The software objects may be created with the information defined by the aforementioned route definition process. That is, in step 500, the overall transit network is decomposed into a sequence of segments using one or more of the characteristics described above. Then, individual routes are defined in step 502 as a segment list that is comprised of all segments a target 12 will traverse in following a route.

Once these items are defined, a segment object is created in step 504 for each segment in the network. Similarly, a route object is created in step 506 for each route. If a segment is used to define a route, that segment object is added to the route object's list of segments in step 508. Similarly, that route object is added in step 510 to the segment object's list of routes. Thus, there is an interrelation between one or more segment objects and route objects. Formally stated, a route object $RO_i$ is created in software for each actual route $RO_i$, and a segment object $SO_j$ is created in software for each actual segment $S_j$. Then, for each $RO_i$ and $SO_j$, $SO_j$ is added to $RO_i$'s list of segments if a segment $S_j$ is within a given route $R_i$. Also, $RO_i$ is added to $SO_j$'s list of Routes if that segment $S_j$ is within the route $R_i$.

With access to the route objects that make use of it, a segment object is able to check the visibility state of a route object and thereby determine whether that route object's display indicator should be included in the interleaved pattern. Thus, if a user elects to make a certain route visible, the pattern or color associated with that route will be used in building the interleaved pattern in step 512. The interleaved pattern may be constructed from a compiled list of patterns or colors associated with the visible route objects that use it. The segment object is then rendered to the display as a series of lines connecting its points. In one embodiment, each pattern or color is used to draw the segment object for a given distance before changing to the next pattern or color in the sequence. The patterns or colors can be cycled as needed until the full length of the segment object is rendered.

Subsequently, the route network, including all interleaved and non-interleaved segments are made available for the various displays 14 in step 514. While the route display status remains unchanged (e.g., route visibility remains the same), the route network provided in step 514 remains the same. However, if the route visibility changes as identified by the YES path in decision step 516, the one or more route objects that change are able to notify its constituent segment objects of this change. As a result, the segment objects rebuild the interleaved pattern in step 512 according to the updated route visibility. Then, the updated route network, including the updated interleaved segments, are made available for the various displays 14 in step 514.

Figure 6:
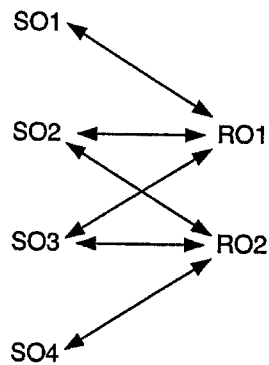
FIG. 6 is a functional block diagram illustrating a scheme for disseminating route visibility information according to one embodiment.

In embodiments discussed above, a plurality of route objects and segment objects are interrelated as depicted in FIG. 6. As described above, the segment objects SO1-SO4 have a knowledge of routes used by those segments and route objects RO1-RO2 have a knowledge of segments that make up those routes. In the embodiment shown, routes identified by RO1 and RO2 share segments identified by SO2 and SO3. Consequently, information regarding route visibility changes and the display changes that are caused by such changes may be disseminated through the interrelated communications scheme shown.

With this scheme, various techniques may be used to notify segment objects SO1-SO4 of visibility changes. In one embodiment, the route objects RO1-RO2 notify segment objects SO1-SO4 of the precise nature of the visibility change that occurs. For instance, the segment objects SO1-SO4 are notified when route object RO1 or RO2 changes from ON to OFF or OFF to ON. In one embodiment, the route objects RO1-RO2 notify segments that this visibility change has occurred and the segments then render a shared pattern including only display indicators for visible routes that use the shared segments. In this embodiment, the route objects RO1-RO2 may notify only those segment objects SO1-SO4 that make up the route. In FIG. 6, route object RO1 notifies SO1-SO3 and route object RO2 notifies SO2-SO4. Alternatively, the route objects RO1-RO2 may notify all segments. Upon receiving the updated visibility information, all segment objects SO1-SO4 may be rendered again. Alternatively, only those segment objects SO1-SO4 affected by the visibility change are rendered again.

In an alternative embodiment, the route objects RO1-RO2 merely notify the segment objects SO1-SO4 that there has been a change in visibility status (not the precise nature of the change). At this point, the segment objects SO1-SO4 may poll route objects RO1-RO2 using that segment to determine if a change is indicated. As above, the route objects RO1-RO2 may notify all segment objects SO1-SO4 or only those segment objects SO1-SO4 used by a given route.

Figure 7:
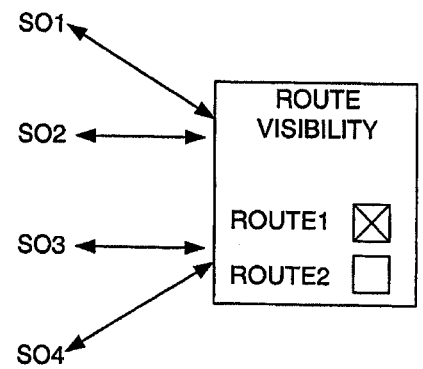
FIG. 7 is a functional block diagram illustrating a scheme for disseminating route visibility information according to one embodiment.

FIG. 7 shows an alternative embodiment where the route visibility information is centrally stored and accessible by all segment objects SO1-SO4. The route visibility information may be stored in a table, registry, or memory location and accessible through pointers. In this embodiment, the segment objects SO1-SO4 may receive a general notification that visibility change for one or more routes has occurred. The, the segment objects SO1-SO4 may then access the route visibility information to determine if a given segment needs to be redrawn.

Figure 8:
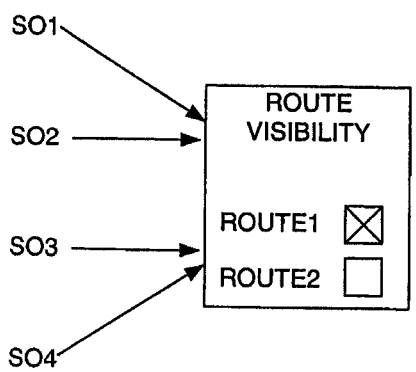
FIG. 8 is a functional block diagram illustrating a scheme for disseminating route visibility information according to one embodiment.

FIG. 8 shows a slightly different embodiment where the route visibility information is again centrally stored. However, in this embodiment, the segment objects SO1-SO4 periodically poll the information to determine if there have been any changes. Segments are then redrawn when a change in the route visibility is detected. In an alternative embodiment, the segment objects SO1-SO2 may periodically poll route objects RO1-RO2 (as in FIG. 6) to determine if there have been any visibility changes.

Figure 9:
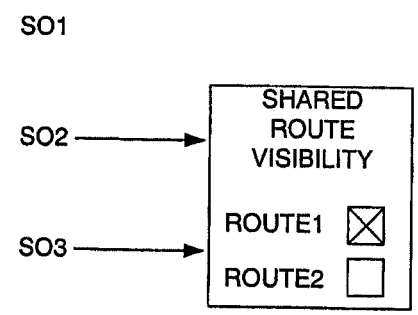
FIG. 9 is a functional block diagram illustrating a scheme for disseminating route visibility information according to one embodiment.

FIG. 9 shows an alternative embodiment similar to FIG. 8 except that the visibility information is limited to shared routes. Thus, only segment objects SO2, SO3, which are the only shared segments in the present example, access the shared route visibility information. These segments SO2, SO3 periodically poll the information to determine if there have been any changes. These segments are then redrawn when a change in the route visibility is detected.

In some embodiments, the display for shared segments may cause confusion or be overly detailed for a viewer to discern the various routes. Examples of when this may occur include when numerous different routes share a common route segment, or when the shared route segment is short relative to the number of shared routes. To address this concern, the indicators for the shared routes may be cyclically displayed along the shared segments.

Figure 10A:
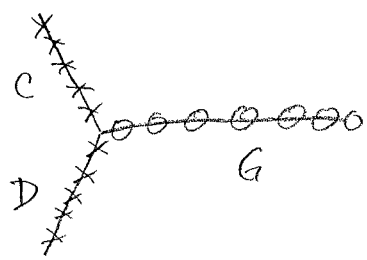
FIGS. 10A and 10B illustrate mapped route segments at different time periods according to one embodiment.
Figure 10B:
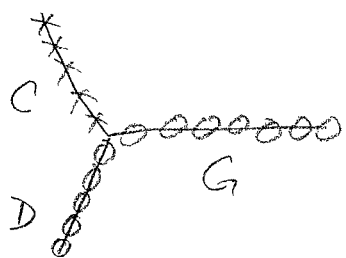

FIGS. 10A and 10B illustrate an embodiment for routes R1 and R2 that uses the map from FIG. 2. In this embodiment, route segment C is only used by route R1, route segment G is only used by route R2, and route segment D is shared by both routes R1 and R2. For the non-shared segments (segment C and G), the respective display indicators are displayed along the routes. For the shared segment (segment D), the shared display indicators are displayed in a cycling pattern. The cycling pattern displays just the first route indicator for a period of time followed by just the second route indicator for another period of time. This pattern is repeated during the selection of both routes. The cycling pattern is illustrated in FIGS. 10A and 10B with FIG. 10A including a first time period when the indicator for route R1 is displayed along segment D. FIG. 10B illustrates a second time period when the indicator for route R2 is displayed along the segment D.

FIGS. 10A and 10B include the cycling pattern used along a route segment that shares two routes. The cycling pattern may be used for route segments that share more than two routes. In the various patterns, each of the display indicators that are shared along a route segment is displayed for a given period of time. The amount of time that each of the individual indicators is displayed may vary. In one embodiment, each of the display indicators is individually displayed for the same amount of time (e.g., 10 seconds). Other embodiments may include one of the display indicators being displayed for a longer period of time. This may occur when one of the routes is a major route with a higher capacity than the other one or more routes that share the segment.

During the cycling pattern, one of the display indicators is displayed at any given time. Preferably, there is no time during the cycling pattern in which a display indicator is not displayed along a shared segment.

As illustrated in FIGS. 10A and 10B, the display indicators along the shared segment may be displayed in a single-file arrangement. Further, the width of the display indicators along the shared segment is the same width as the indicators along the non-shared segments.

Figure 11:
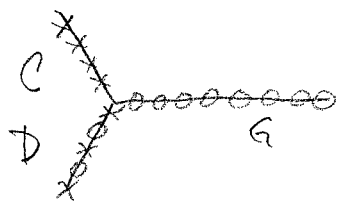
FIG. 11 illustrates mapped route segments according to one embodiment.

The cycling pattern may also include a period in which both indicators are displayed as illustrated in FIG. 11. The indicators may be displayed in a repeating pattern as discussed above, or in a variety of other display methods to indicate to a viewer that the segment is shared by multiple different routes. In one embodiment, the cycling pattern includes individually displaying each display indicator for a period of time, and then displaying the display indicators in a repeating period for a period of time.

Figure 12A:
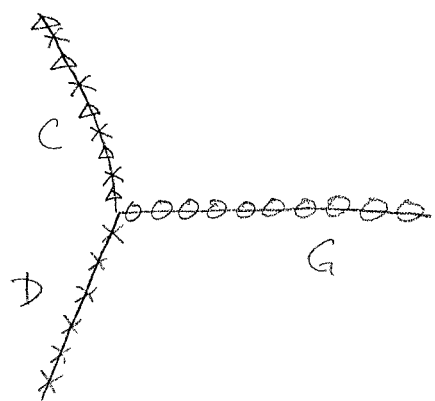
FIGS. 12A, 12B, and 12C illustrate mapped route segments at different time periods according to one embodiment.
Figure 12B:
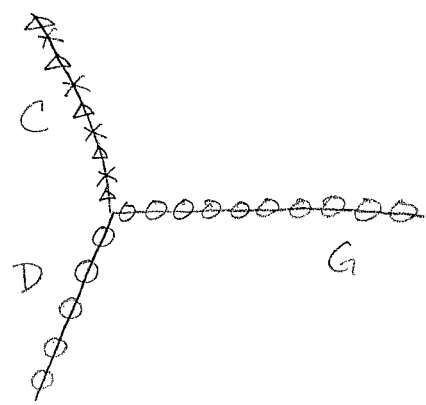
Figure 12C:
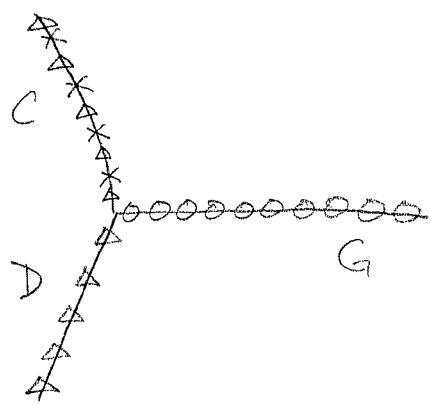

FIGS. 12A, 12B, and 12C illustrate another embodiment using the map of FIG. 2 as it relates to the display of routes R1, R2, and R3. In this section of the map, segment C is shared by routes R1 and R3, segment D is shared by routes R1, R2, and R3, and segment G is only used by route R2. For segment D, the three routes are individually displayed in a cycling pattern. FIG. 12A includes the indicator for route R1 being displayed, followed by FIG. 12B that illustrates the indicator for route R2 being displayed, and followed by FIG. 12C that includes the indicator for route R3 being displayed. This cycling pattern repeats as described above. At the same time as the individual display indicators are displayed along the shared segment D, the indicator for R2 is displayed along the non-shared segment G.

Other shared segments may be displayed in different patterns other than a cycling pattern. As illustrated in FIGS. 12A-12C, segment C includes shared routes R1 and R3 and is displayed by a repeating pattern of the respective indicators. The determination of whether to display in an interleaved pattern or a cyclical pattern may depend upon various aspects, such as the number of shared routes along a segment, and the length of the shared segment relative to the number of shared routes along the segment.

The present invention may be carried out in other specific ways than those herein set forth without departing from the scope and essential characteristics of the invention. For example, certain embodiments described above have contemplated a dynamic rendering process where interleaving is performed on the fly. Another possibility is when a network of transit routes is fairly static (e.g., routes do not vary significantly for extended periods). In these cases, it may be appropriate to define the segments once, and store them is some intermediate representation, so that they can be retrieved whenever route visualization is required. This intermediate representation could most likely be a computer file and could be stored locally or transferred over a network when a viewing session is initiated. The later case may be beneficial in web-based client/server situations where automatic updates of route data are required.

Furthermore, while various embodiments have related to public transportation networks and routes used by vehicles, other embodiments could be applied to communication networks and networks in general where multiple routes share paths. For example, circuit networks, HVAC networks, assembly lines, and the sort may benefit from the teachings described herein. The present embodiments are, therefore, to be considered in all respects as illustrative and not restrictive, and all changes coming within the meaning and equivalency range of the appended claims are intended to be embraced therein.

What is claimed is:

1. A method of displaying on an electronic display a graphical depiction of route information determined by an electronic route processor, the method comprising:
   accessing a computer memory and obtaining data defining a first route and a second route;

assigning a first display indicator to the first route;
assigning a second display indicator to the second route;
processing the first and second routes in the electronic route processor and determining discrete route segments that are shared by both the first and second routes; and
displaying on the electronic display as the graphical depiction of the route information a repeating pattern of the first and second route indicators along the same discrete shared route segments with the repeating pattern including one or more of the first route indicators followed by one or more of the second route indicators;
displaying on the electronic display non-shared segments of the first route with the first display indicator and displaying non-shared segments of the second route with the second display indicator;
the repeating pattern displayed along the same discrete shared route segments being visually distinct from each of the first and second display indicators displayed along the non-shared segments to visually differentiate the shared route segments.

2. The method of claim 1, further comprising displaying on the electronic display a first target moving along the first route and a second target moving along the second route.

3. The method of claim 1, wherein the width of the repeating pattern displayed on the electronic display is substantially the same as the width of the non-shared segments.

4. The method of claim 1, wherein the repeating pattern includes a single-file row of the first and second route indicators.

5. The method of claim 1, wherein processing the first and second routes in the electronic route processor and determining discrete route segments that are shared by both the first and second routes includes decomposing in the electronic processor each of the routes into discrete route segments.

6. A method of displaying on an electronic display a graphical depiction of route information determined by an electronic route processor, the method comprising:
accessing a computer memory and obtaining data defining a first route and a second route;
assigning a first display indicator to the first route;
assigning a second display indicator to the second route;
processing the first and second routes in the electronic route processor and determining discrete route segments that are shared by both the first and second routes; and
displaying on the electronic display as the graphical depiction of the route information the first display indicator along non-shared segments of the first route, the second display indicator along non-shared segments of the second route, and a timed cycling pattern of the first display indicators along the one or more shared route segments for a first time interval and the second display indicators along the one or more shared route segments for a second time interval.

7. The method of claim 6, wherein processing the first and second routes in the electronic route processor and determining discrete route segments that are shared by both the first and second routes includes decomposing in the electronic processor each of the routes into discrete route segments.

8. The method of claim 6, wherein the first and second time intervals are the same.

9. The method of claim 6, further comprising assigning a visibility state to each of the first and second routes and displaying on the electronic display the cycling pattern when the visibility state of the first and second routes is in an on condition.

10. The method of claim 9, further comprising displaying on the electronic display the one or more shared segments using the first display indicator for the first route when the visibility state of the second route is in an off condition.

11. The method of claim 6, wherein a width of the one or more shared segments that includes the cycling pattern is substantially the same as a width of the non-shared segments that includes the first and second display indicators.

12. The method of claim 6, further comprising displaying on the electronic display one or more tracked targets moving along the first and second routes.

13. The method of claim 12, wherein the tracked targets comprise transit vehicles.

* * * * *